United States Patent
Morita et al.

(10) Patent No.: US 7,591,986 B2
(45) Date of Patent: Sep. 22, 2009

(54) EXHAUST EMISSION CONTROL DEVICE AND METHOD FOR INTERNAL COMBUSTION ENGINE, AND ENGINE CONTROL UNIT

(75) Inventors: Tomoko Morita, Saitama-ken (JP); Norio Suzuki, Saitama-ken (JP); Hiroshi Ohno, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 11/984,742

(22) Filed: Nov. 21, 2007

(65) Prior Publication Data

US 2008/0124263 A1 May 29, 2008

(30) Foreign Application Priority Data

Nov. 24, 2006 (JP) ............................. 2006-317856

(51) Int. Cl.
- B01D 53/56 (2006.01)
- B01D 53/94 (2006.01)
- F01N 3/10 (2006.01)
- F01N 3/18 (2006.01)

(52) U.S. Cl. ............... 423/213.2; 423/213.7; 423/239.1; 423/DIG. 5; 423/DIG. 6; 422/105; 422/108; 422/111; 60/274; 60/276; 60/282; 60/299; 701/102; 701/109

(58) Field of Classification Search ............... 423/213.2, 423/213.7, 239.1, DIG. 5, DIG. 6; 422/105, 422/108, 111; 60/274, 276, 282, 299; 701/102, 701/109
See application file for complete search history.

(56) References Cited

U.S. PATENT DOCUMENTS

| | | | | |
|---|---|---|---|---|
| 6,742,327 | B2 * | 6/2004 | Inoue et al. | 60/285 |
| 7,152,395 | B2 * | 12/2006 | Inoue et al. | 60/286 |
| 2008/0131346 | A1 * | 6/2008 | Morita et al. | 423/239.1 |

* cited by examiner

Primary Examiner—Timothy C Vanoy
(74) Attorney, Agent, or Firm—Arent Fox LLP

(57) ABSTRACT

An exhaust emission control device which is capable of supplying a just enough amount of reducing agent to a NOx catalyst while causing the amount of reducing agent consumed in an upstream catalyst to be reflected thereon. A NOx catalyst for trapping NOx and reducing NOx to change the same into harmless ingredients in a reducing atmosphere is disposed downstream of a catalyst. Reducing agent is supplied upstream of the catalyst to cause the NOx catalyst to perform a NOx-reducing action. The amount of oxygen occluded in the catalyst is calculated. During reduction control, according to the oxygen occlusion amount, the amount of reducing agent oxidized and consumed in the catalyst is calculated. According to the reducing agent consumption amount, the amount of reducing agent supplied to the NOx catalyst is calculated. The reduction control is terminated based on the reducing agent supply amount.

9 Claims, 9 Drawing Sheets

EXHAUST EMISSION CONTROL DEVICE AND METHOD FOR INTERNAL COMBUSTION ENGINE, AND ENGINE CONTROL UNIT

BACKGROUND OF THE INVENTION

1. Field of the Invention

The present invention relates to an exhaust emission control device and method for an internal combustion engine, and an engine control unit, for purifying exhaust emissions by temporarily trapping NOx contained in exhaust gases discharged from the engine and performing reduction of the trapped NOx.

2. Description of the Related Art

Conventionally, there has been disclosed an exhaust emission control device for an internal combustion engine, e.g. in Japanese Laid-Open Patent Publication (Kokai) No. 2006-207487. This internal combustion engine is a diesel engine having an exhaust pipe, and a three-way catalyst and a NOx catalyst are arranged in the exhaust pipe in this order from the upstream side to the downstream side, for purifying HC and CO, i.e. reducing HC and CO emissions mainly during low temperature, and for purifying NOx, i.e. reducing NOx emissions, respectively. According to this exhaust emission control device, exhaust gases discharged from the engine during lean burn operation pass through the three-way catalyst and flow into the NOx catalyst to be temporarily trapped therein.

Then, when the amount of trapped NOx reaches a predetermined value, a rich spike operation is carried out in which the air-fuel ratio of a mixture supplied to the engine is controlled to a richer side than a stoichiometric air-fuel ratio. The rich spike operation causes unburned fuel components to be supplied to the NOx catalyst as reducing agent, whereby the NOx trapped in the NOx catalyst is reduced to be purified, i.e. changed into harmless ingredients. Further, the amount of reducing agent supplied to the NOx catalyst is calculated based on the air-fuel ratio detected by an air-fuel ratio sensor upstream of the three-way catalyst and the space velocity of exhaust gases, and when the cumulative value exceeds a threshold value set according to the amount of trapped NOx, it is judged that the reduction of NOx is complete, and the rich spike operation is terminated.

As described above, in the conventional exhaust emission control device, since the three-way catalyst is disposed upstream of the NOx catalyst, reducing agent supplied by the rich spike operation is consumed in the three-way catalyst to some extent, and then is supplied to the NOx catalyst. More specifically, reducing agent is oxidized and consumed by oxygen stored in the three-way catalyst during lean operation of the engine before the start of the rich spike operation, and accordingly, the amount of reducing agent supplied to the NOx catalyst is reduced.

However, in the conventional exhaust emission control device, the amount of reducing agent supplied to the NOx catalyst is only calculated based on the detected air-fuel ratio upstream of the three-way catalyst. Therefore, when the amount of reducing agent consumed in the three-way catalyst is large, the amount of reducing agent supplied to the NOx catalyst is calculated to be larger than the amount of actually supplied reducing agent, so that the cumulative value of the supply amount of reducing agent exceeds a threshold value before the reduction of NOx is completed, causing an increase in exhaust emissions due to insufficient reduction of NOx. Inversely, when the amount of reducing agent consumed in the three-way catalyst is small, the termination of the rich spike operation becomes later than it should be to supply an excessive amount of reducing agent, which increases exhaust emissions due to excessive supply of CO and HC, and degrades fuel economy.

SUMMARY OF THE INVENTION

It is an object of the present invention to provide an exhaust emission control device and method for an internal combustion engine, and an engine control unit, which is capable of supplying a just enough amount of reducing agent to a NOx catalyst while causing the amount of reducing agent consumed in an upstream catalyst to be reflected thereon, to thereby reduce exhaust emissions and improve fuel economy.

To attain the above object, in a first aspect of the present invention, there is provided an exhaust emission control device for an internal combustion engine, for purifying exhaust gases discharged from the engine into an exhaust system, comprising a catalyst that is disposed in the exhaust system and has an oxygen occlusion function and an oxidation function for purifying exhaust gases, a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx, NOx reduction control means for executing reduction control in which the exhaust gases flowing into the NOx catalyst are controlled to the reducing atmosphere, by supplying reducing agent to an upstream side of the catalyst so as to cause the NOx catalyst to carry out an operation for reducing NOx, oxygen occlusion amount-calculating means for calculating an amount of oxygen occluded in the catalyst as an oxygen occlusion amount, reducing agent consumption amount-calculating means for calculating an amount of reducing agent consumed by oxidation in the catalyst during execution of the reduction control by the NOx reduction control by the NOx reduction control means, as a reducing agent consumption amount, according to the calculated oxygen occlusion amount, reducing agent supply amount-calculating means for calculating an amount of reducing agent supplied to the NOx catalyst, as a reducing agent supply amount, according to the calculated reducing agent consumption amount, and reduction control-terminating means for terminating the reduction control when the calculated reducing agent supply amount exceeds a threshold value.

With the configuration of this exhaust emission control device, a catalyst having an oxygen occlusion function and an oxidation function and a NOx catalyst are arranged at respective upstream and downstream locations of the exhaust system of the engine. NOx contained in exhaust gases discharged from the engine is trapped by the NOx catalyst in an oxidizing atmosphere. Further, the NOx reduction control means causes reducing agent to be supplied to an upstream side of the catalyst to execute reduction control in which exhaust gases flowing into the NOx catalyst are controlled to the reducing atmosphere, whereby the NOx trapped in the NOx catalyst is reduced to be purified, i.e. changed into harmless ingredients.

As described above, when the catalyst is disposed on the upstream side of the NOx catalyst, and the reducing agent is supplied to the upstream side of the catalyst, the supplied reducing agent is oxidized and consumed by oxygen stored in the three-way catalyst during lean operation before the start of reduction control by the NOx reduction means, and then reaches the NOx catalyst. With the configuration of the exhaust emission control device according to the first aspect of the present invention, the amount of reducing agent occluded in the catalyst is calculated, and according to the calculated oxygen occlusion amount, during execution of the reduction control, the amount of reducing agent consumed in the catalyst by oxidation is calculated, and the amount of reducing agent supplied to the NOx catalyst is calculated according to the calculated consumption amount of reducing agent.

Therefore, it is possible to accurately calculate the reducing agent supply amount indicative of the amount of reducing agent actually supplied to the NOx catalyst while causing the amount of reducing agent consumed by oxidation in the upstream catalyst to be reflected thereon. Then, when the thus calculated reducing agent supply amount exceeds the threshold value, the rich spike operation is terminated. Therefore, it is possible to supply a just enough amount of reducing agent to the NOx catalyst. As a result, it possible to reduce exhaust emissions and improve fuel economy without causing insufficient reduction of NOx or excessive generation of HC and CO.

Preferably, the exhaust emission control device further comprises catalyst temperature-detecting means for detecting a temperature of the catalyst, and the oxygen occlusion amount-calculating means calculates the oxygen occlusion amount according to the detected temperature of the catalyst.

With this configuration of the preferred embodiment, as the temperature of the catalyst is higher, the degree of activity thereof is higher, which increases the oxygen occlusion ability of the catalyst. With this configuration of the preferred embodiment, the oxygen occlusion amount is calculated according to the actually detected temperature of the catalyst, and hence it is possible to calculate the oxygen occlusion amount with higher accuracy.

Preferably, the exhaust emission control device further comprises upstream air-fuel ratio-detecting means for detecting an air-fuel ratio upstream of the catalyst, and downstream air-fuel ratio-detecting means for detecting an air-fuel ratio downstream of the catalyst, and the oxygen occlusion amount-calculating means calculates the oxygen occlusion amount according to a difference between the detected upstream air-fuel ratio and the detected downstream air-fuel ratio.

With this configuration of the preferred embodiment, in a state where oxygen is adsorbed (deprived of) by the catalyst, the air-fuel ratio downstream of the catalyst becomes lower than that upstream of the same, and hence the difference therebetween becomes larger as the degree of adsorption of oxygen in the catalyst is higher. With the configuration of the preferred embodiment, the oxygen occlusion amount is calculated according to the difference between the air-fuel ratio upstream of the catalyst and that downstream of the same, and hence it is possible to more accurately calculate the oxygen occlusion amount while causing the degree of adsorption of oxygen in the catalyst to be reflected thereon.

To attain the object, in a second aspect of the present invention, there is provided an exhaust emission control method for purifying exhaust gases discharged from an internal combustion engine into an exhaust system, the engine including a catalyst that is disposed in the exhaust system and has an oxygen occlusion function and an oxidation function for purifying exhaust gases, and a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx, the exhaust emission control method comprising a NOx reduction control step of executing reduction control in which the exhaust gases flowing into the NOx catalyst are controlled to the reducing atmosphere, by supplying reducing agent to an upstream side of the catalyst so as to cause the NOx catalyst to carry out an operation for reducing NOx, an oxygen occlusion amount-calculating step of calculating an amount of oxygen occluded in the catalyst as an oxygen occlusion amount, a reducing agent consumption amount-calculating step of calculating an amount of reducing agent consumed by oxidation in the catalyst during execution of the reduction control by the NOx reduction control in the NOx reduction control step, as a reducing agent consumption amount, according to the calculated oxygen occlusion amount, a reducing agent supply amount-calculating step of calculating an amount of reducing agent supplied to the NOx catalyst, as a reducing agent supply amount, according to the calculated reducing agent consumption amount, and a reduction control-terminating step of terminating the reduction control when the calculated reducing agent supply amount exceeds a threshold value.

With the configuration of the second aspect of the present invention, it is possible to obtain the same advantageous effects as provided by the first aspect of the present invention.

Preferably, the exhaust emission control method further comprise a catalyst temperature-detecting step of detecting a temperature of the catalyst, and the oxygen occlusion amount-calculating step includes calculating the oxygen occlusion amount according to the detected temperature of the catalyst.

Preferably, the exhaust emission control method further comprises an upstream air-fuel ratio-detecting step of detecting an air-fuel ratio upstream of the catalyst, and a downstream air-fuel ratio-detecting step of detecting an air-fuel ratio downstream of the catalyst, and the oxygen occlusion amount-calculating step includes calculating the oxygen occlusion amount according to a difference between the detected upstream air-fuel ratio and the detected downstream air-fuel ratio.

With the configuration of the preferred embodiment, it is possible to obtain the same advantageous effects as provided by the respective corresponding preferred embodiments of the first aspect of the present invention.

To attain the object, in a third aspect of the present invention, there is provided an engine control unit including a control program for causing a computer to execute an exhaust emission control method for purifying exhaust gases discharged from an internal combustion engine into an exhaust system, the engine including a catalyst that is disposed in the exhaust system and has an oxygen occlusion function and an oxidation function for purifying exhaust gases, and a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx, wherein the control program causes the computer to execute reduction control in which the exhaust gases flowing into the NOx catalyst are controlled to the reducing atmosphere, by supplying reducing agent to an upstream side of the catalyst so as to cause the NOx catalyst to carry out an operation for reducing NOx, calculate an amount of oxygen occluded in the catalyst as an oxygen occlusion amount, calculate an amount of reducing agent consumed by oxidation in the catalyst during execution of the reduction control by the NOx reduction control, as a reducing agent consumption amount, according to the calculated oxygen occlusion amount, calculate an amount of reducing agent supplied to the NOx catalyst, as a reducing agent supply amount, according to the calculated reducing agent consumption amount, and terminate the reduction control when the calculated reducing agent supply amount exceeds a threshold value.

With the configuration of the third aspect of the present invention, it is possible to obtain the same advantageous effects as provided by the first aspect of the present invention.

Preferably, the control program causes the computer to detect a temperature of the catalyst, and calculate the oxygen occlusion amount according to the detected temperature of the catalyst.

Preferably, the control program causes the computer to detect an air-fuel ratio upstream of the catalyst, detect an air-fuel ratio downstream of the catalyst, and calculate the oxygen occlusion amount according to a difference between the detected upstream air-fuel ratio and the detected downstream air-fuel ratio.

With the configuration of the preferred embodiment, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
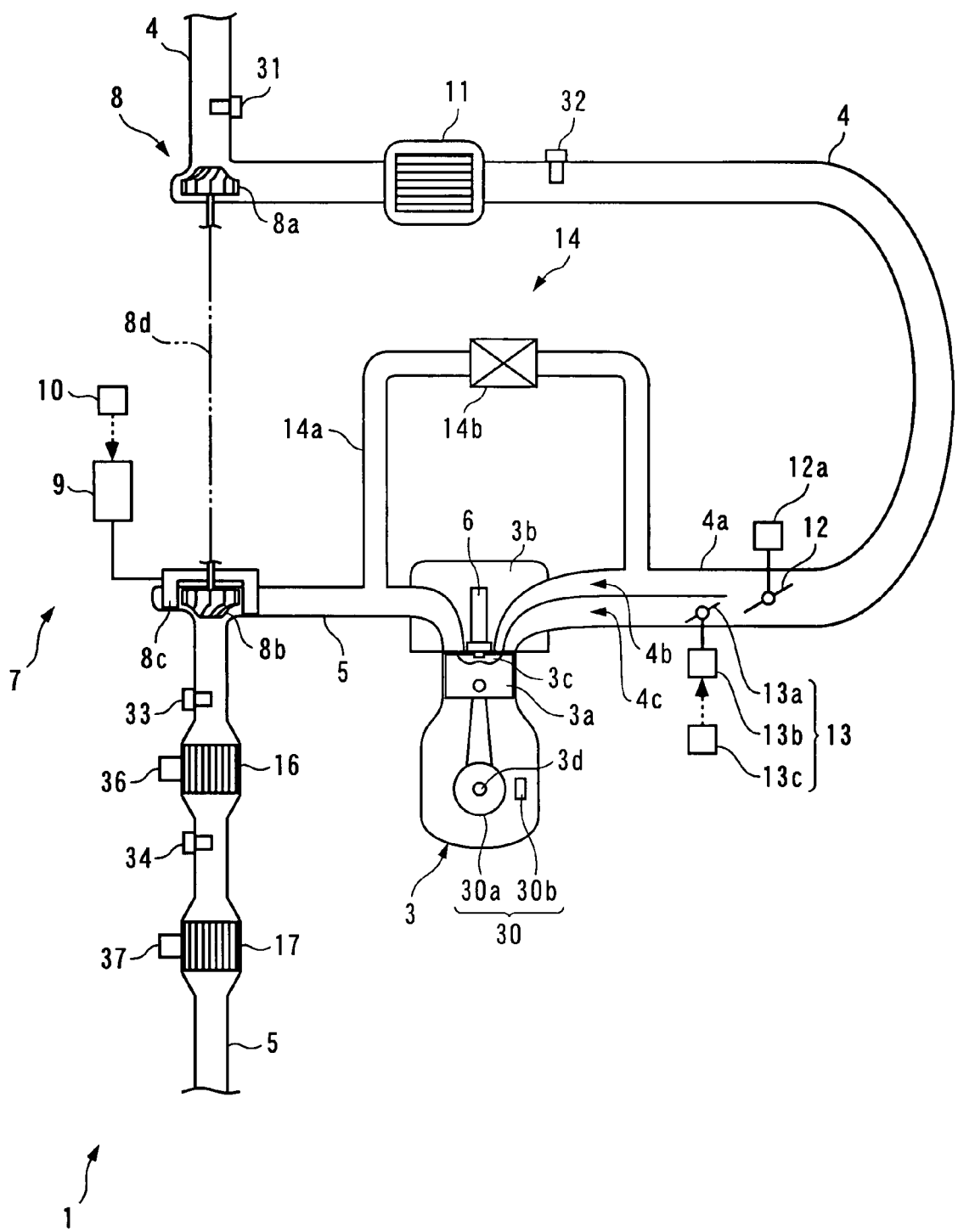
FIG. 1 is a schematic diagram of an internal combustion engine to which is applied an exhaust emission control device according to the present invention.

Hereafter, an exhaust emission control device according to an embodiment of the present invention will be described with reference to the drawings. FIG. 1 is a diagram showing the exhaust emission control device 1 to which is applied the present invention, and an internal combustion engine 3. The engine (hereinafter simply referred to as "the engine") 3 is a diesel engine that has e.g. four cylinders (only one of which is shown), and is installed on a vehicle (not shown).

A combustion chamber $3c$ is defined between a piston $3a$ and a cylinder head $3b$ for each cylinder of the engine 3. The cylinder head $3b$ has an intake pipe 4 and an exhaust pipe 5 connected thereto, with a fuel injection valve (hereinafter referred to as "the injector") 6 (NOx reduction control means) mounted therethrough such that it faces the combustion chamber $3c$.

Figure 2:
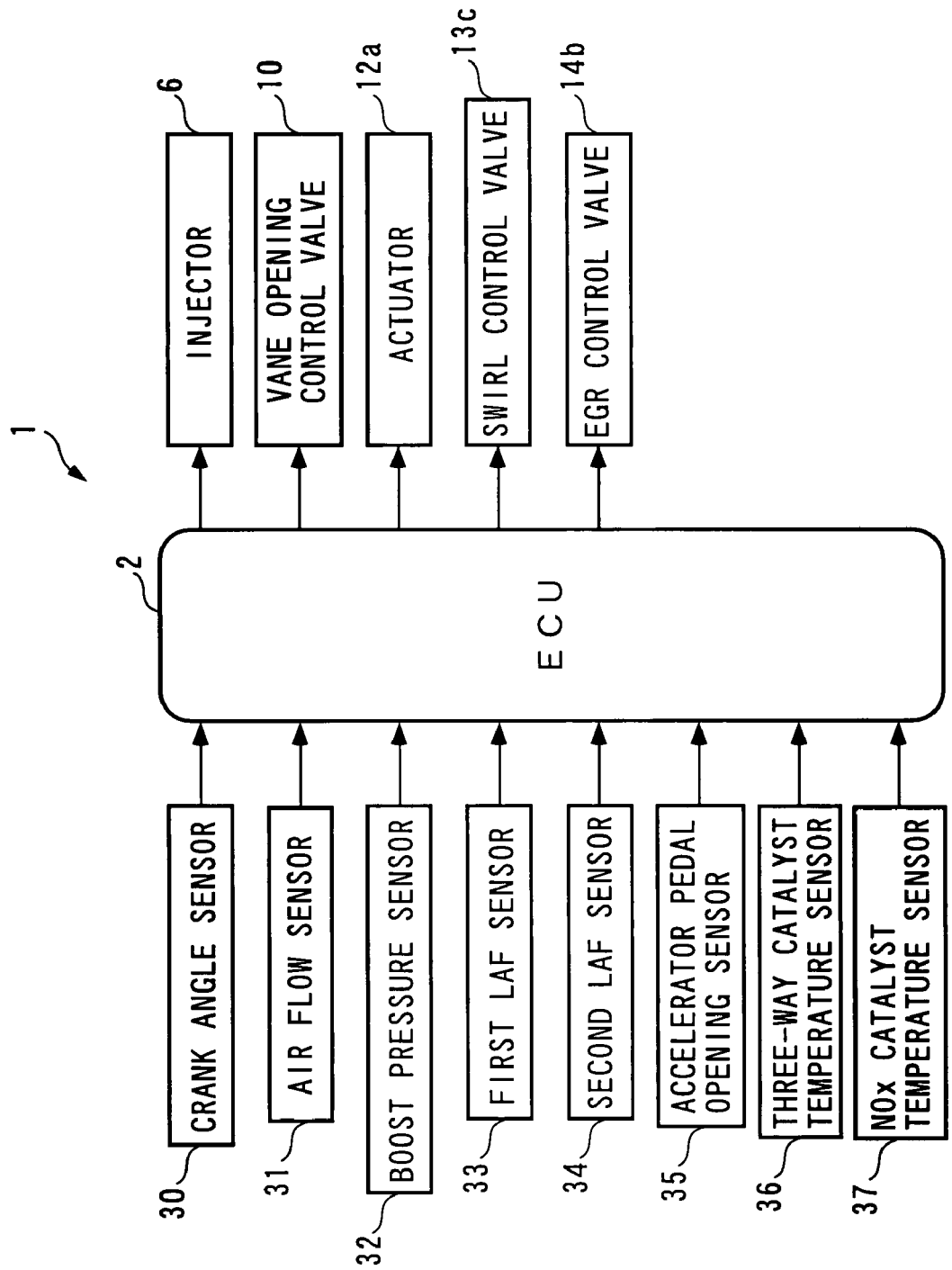
FIG. 2 is a block diagram showing a relationship between an ECU and signals input thereto and output therefrom.

The injector 6 is inserted into the combustion chamber $3c$ through a central portion of the top wall thereof, and is connected to a high-pressure pump and a fuel tank, neither of which is shown, in the mentioned order via a common rail. A fuel injection amount TOUT of fuel injected from the injector 6 is controlled by controlling the valve-opening time period thereof by a drive signal from the ECU 2 (see FIG. 2).

A magnet rotor $30a$ is mounted on a crankshaft $3d$ of the engine 3. The magnet rotor $30a$ and an MRE pickup $30b$ form a crank angle sensor 30 which delivers a CRK signal and a TDC signal, which are both pulse signals, to the ECU 2 along with rotation of the crankshaft $3d$.

Each pulse of the CRK signal is generated whenever the crankshaft $3d$ rotates through a predetermined crank angle (e.g. 30°). The ECU 2 calculates rotational speed (hereinafter referred to as "the engine speed") NE of the engine 3 based on the CRK signal. The TDC signal indicates that the piston $3a$ of each cylinder is at a predetermined crank angle position in the vicinity of the top dead center (TDC) at the start of the intake stroke thereof, and in the case of the four-cylinder engine of the illustrated example, it is delivered whenever the crankshaft $3d$ rotates through 180 degrees.

The intake pipe 4 has a supercharging device 7 disposed therein. The supercharging device 7 is comprised of a supercharger 8 formed by a turbo charger, an actuator 9 connected to the supercharger 8, and a vane opening control valve 10.

The supercharger 8 includes a compressor blade $8a$ rotatably mounted in the intake pipe 4, a rotatable turbine blade $8b$ and a plurality of rotatable variable vanes $8c$ (only two of which are shown) provided in the exhaust pipe 5, and a shaft $8d$ integrally formed with the two blades $8a$ and $8b$ such that the shaft $8d$ connects them. In the supercharger 8, as the turbine blade $8b$ is driven for rotation by exhaust gases flowing through the exhaust pipe 5, the compressor blade $8a$ integrally formed with the shaft $8d$ which connects between the compressor blade $8a$ and the turbine blade $8b$ is also rotated is also rotated, whereby the supercharger 8 is caused to perform a supercharging operation for pressurizing intake air in the intake pipe 4.

The actuator 9 is of a diaphragm type which is operated by negative pressure, and is mechanically connected to the respective variable vanes $8c$. The actuator 9 has negative pressure supplied from a negative pressure pump (not shown) through a negative pressure supply passage, not shown. The vane opening control valve 10 is disposed in an intermediate portion of the negative pressure supply passage. The vane opening control valve 10 is formed by an electromagnetic valve, and the degree of opening thereof is controlled by a drive signal from the ECU 2, whereby negative pressure to be supplied to the actuator 9 is changed to change the degree of opening of the variable vanes $8c$. Thus, boost pressure is controlled.

An intercooler 11 of a water cooling type, and a throttle valve 12 (NOx reduction control means) are inserted into the intake pipe 4 at respective locations downstream of the supercharger 8 from upstream to downstream in the mentioned order. The intercooler 11 is provided for cooling intake air e.g. when the temperature of the intake air is raised by the supercharging operation of the supercharging device 7. An actuator $12a$ comprised e.g. of a DC motor is connected to the throttle valve 12. The opening TH of the throttle valve 12 (hereinafter referred to as "the throttle valve opening TH") is controlled by controlling the duty ratio of electric current supplied to the actuator $12a$ by the ECU 2.

Further, the intake pipe 4 has an air flow sensor 31 inserted therein at a location upstream of the supercharger 8, and a boost pressure sensor 32 inserted therein between the intercooler 11 and the throttle valve 12. The air flow sensor 31 detects an intake air amount QA, to deliver a signal indicative of the sensed intake air amount QA to the ECU 2, while the boost pressure sensor 32 detects boost pressure PACT in the intake pipe 4, to deliver a signal indicative of the sensed boost pressure PACT to the ECU 2.

Furthermore, the intake pipe 4 has an intake manifold 4a divided into a swirl passage 4b and a bypass passage 4c between the collecting section of the intake manifold 4a and each branch portion thereof. The passages 4b and 4c communicate with the combustion chamber 3c via each intake port.

The bypass passage 4c is provided with a swirl device 13 for generating a swirl in the combustion chamber 3c. The swirl device 13 is comprised of a swirl valve 13a, an actuator 13b for actuating the swirl valve 13a to open and close the same, and a swirl control valve 13c. The actuator 13b and the swirl control valve 13c are configured similarly to the actuator 9 and the vane opening control valve 10 of the supercharging device 7, respectively. The swirl control valve 13c is connected to the above-described negative pressure pump. With this arrangement, the degree of opening of the swirl control valve 13c is controlled by a drive signal from the ECU 2, whereby negative pressure supplied to the actuator 13b is changed to change the degree of opening of the swirl valve 13a, whereby the strength of the swirl is controlled.

Further, the engine 3 is provided with an EGR device 14 that has an EGR pipe 14a and an EGR control valve 14b. The EGR pipe 14a connects between the intake pipe 4 and the exhaust pipe 5, more specifically, between the swirl passage 4b in the collecting section of the intake manifold 4a and a portion of the exhaust pipe 5 at a location upstream of the supercharger 8. Part of exhaust gases exhausted from the engine 3 is recirculated into the intake pipe 4 via the EGR pipe 14a as EGR gases.

The EGR control valve 14b is implemented by a linear solenoid valve inserted into the EGR pipe 14a, and the valve lift amount VLACT thereof is linearly controlled by a drive signal under duty ratio control from the ECU 2, whereby the amount of EGR gases is controlled.

A three-way catalyst 16 (catalyst) and a NOx catalyst 17 are provided in the exhaust pipe 5 at respective locations downstream of the supercharger 8 from upstream to downstream in the mentioned order. The three-way catalyst 16 oxidizes HC and CO and performs reduction of NOx in a stoichiometric atmosphere of exhaust gases, to thereby purify i.e. decrease exhaust emissions. The NOx catalyst 17 traps NOx contained in an oxidizing atmosphere of exhaust gases in which the concentration of oxygen is high, and performs reduction of the trapped NOx in a reducing atmosphere in which a large amount of reducing agent is contained in exhaust gases, to thereby purify exhaust emissions.

Further, the three-way catalyst 16 is provided with a three-way catalyst temperature sensor 36 (catalyst temperature-detecting means) for detecting the temperature TTWC of the three-way catalyst 16 (hereinafter referred to as "the three-way catalyst temperature TTWC"), while the NOx catalyst 17 is provided with a NOx catalyst temperature sensor 37 for detecting the temperature TLNC of the NOx catalyst 17 (hereinafter referred to as "the NOx catalyst temperature TLNC"). These sensors 36 and 37 deliver respective signals indicative of the detected NOx catalyst temperature TLNC and three-way catalyst temperature TTWC to the ECU 2.

Furthermore, a first LAF sensor 33 (upstream air-fuel ratio-detecting means) and a second LAF sensor 34 (downstream air-fuel ratio-detecting means) are inserted into the exhaust pipe 5 at respective locations upstream of and downstream of the three-way catalyst 16. The first LAF sensor 33 and the second LAF sensor 34 linearly detect the concentrations VLAF1 and VLAF2 of oxygen in exhaust gases, respectively, in a wide range of the air-fuel ratio ranging from a rich region to a lean region to deliver respective signals indicative of the sensed concentrations of oxygen to the ECU 2. The ECU 2 calculates first and second actual air-fuel ratios AF1_ACT and AF2_ACT indicative of respective air-fuel ratios corresponding to the detected oxygen concentrations VLAF1 and VLAF2, respectively. Further, an accelerator pedal opening sensor 35 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2.

In the present embodiment, the ECU 2 forms NOx reduction control means, oxygen occlusion amount-calculating means, reducing agent consumption amount-calculating means, reducing agent supply amount-calculating means, and reduction control-terminating means, and is implemented by a microcomputer comprised of an I/O interface, a CPU, a RAM, and a ROM (none of which are shown). The detection signals from the aforementioned sensors 30 to 37 are input to the CPU after the I/O interface performs A/D conversion and waveform shaping thereon.

In response to these input signals, the CPU determines operating conditions of the engine 3, and based on the determined operating conditions of the engine, performs engine control, such as fuel injection amount control and intake air amount control, in accordance with control programs read from the ROM. Further, the CPU determines whether or not a rich spike operation should be executed as reduction control for performing reduction of NOx trapped in the NOx catalyst 17, and performs the rich spike operation according to the result of the determination. It should be noted as described hereinafter, the rich spike operation is performed mainly by increasing the fuel injection amount TOUT and decreasing the intake air amount QA, thereby enriching the air-fuel ratio of a mixture supplied to the combustion chamber 3c, to supply unburned components of fuel to the NOx catalyst 17 as reducing agent.

Figure 3:
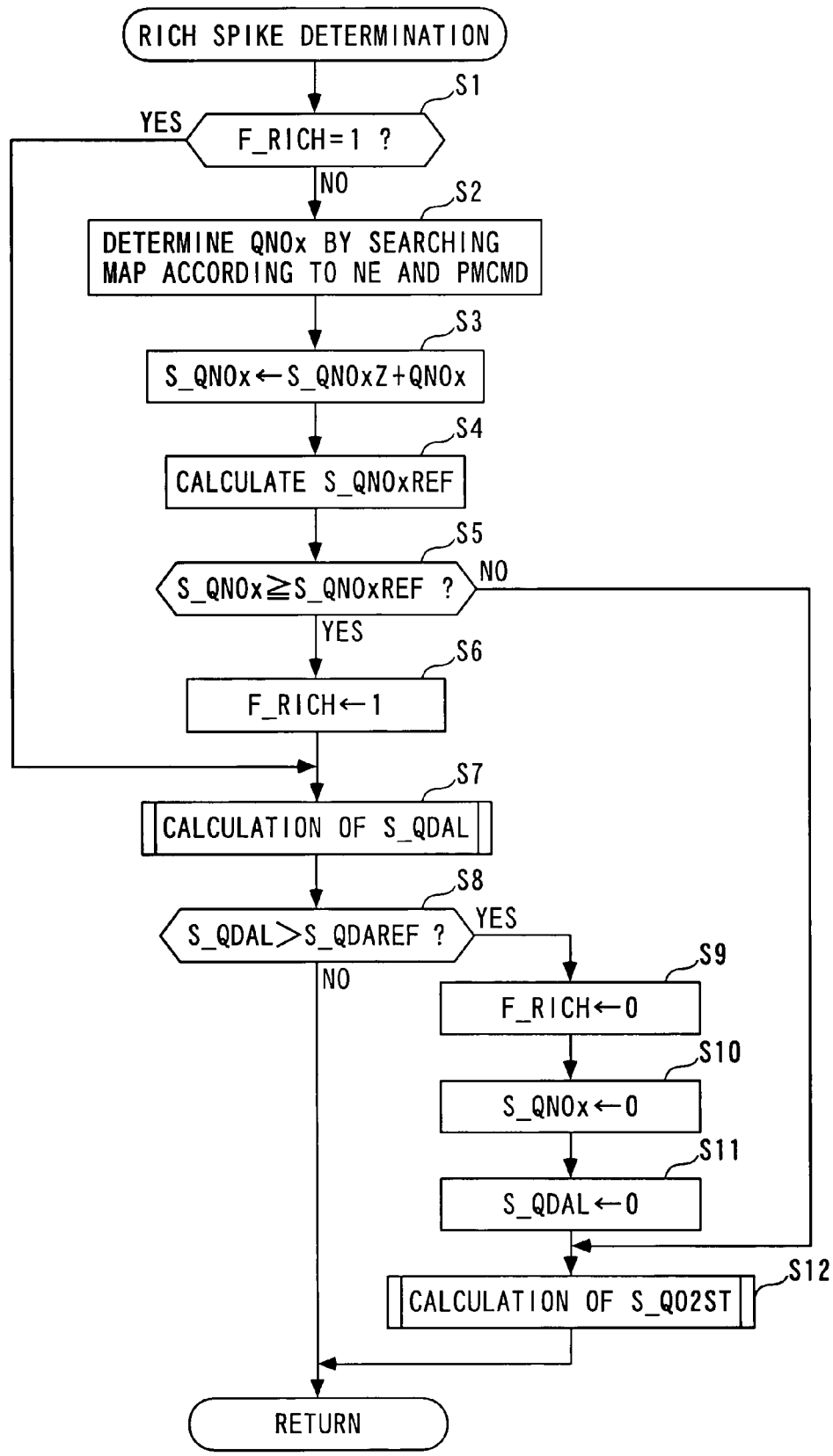
FIG. 3 is a flowchart showing a process for determining execution of a rich spike operation.

FIG. 3 shows a process for determining the execution of the rich spike operation. The rich spike determining process is provided for determining whether or not conditions for executing the rich spike operation are satisfied, and is executed at a predetermined period (e.g. 10 msec) set by a timer.

In this process, first, in a step 1 (shown as S1 in abbreviated form in FIG. 3; the following steps are also shown in abbreviated form), it is determined whether or not a rich spike flag F_RICH is equal to 1. As described hereinafter, the rich spike flag F_RICH is set to 1 when the conditions for executing the rich spike operation are satisfied.

If the answer to the question of the step 1 is negative (NO), i.e. if the rich spike operation is not being executed, during lean operation of the engine, the process proceeds to a step 2, wherein an exhausted NOx amount QNOx is calculated by searching a map (not shown) according to the engine speed NE and demanded torque PMCMD. The exhausted NOx amount QNOx corresponds to the amount of NOx in exhaust gases discharged from the combustion chamber 3c in the present cycle. It should be noted that the demanded torque PMCMD is determined by searching a map (not shown) according to the engine speed NE and the accelerator pedal opening AP.

Next, a trapped NOx amount S_QNOx is calculated by adding the calculated exhausted NOx amount to the immediately preceding value S_QNOxZ of the trapped NOx amount.

That is, the trapped NOx amount S_QNOx corresponds to the amount of NOx having been trapped in the NOx catalyst 17.

Then, in a step 4, a reference value S_QNOxREF is calculated. The reference value S_QNOxREF is calculated according to the trapped NOx amount S_QNOx, NOx catalyst temperature TLNC and the space velocity SV of exhaust gases such that a state of occurrence of NOx slip (phenomenon in which during reduction control of NOx, part of NOx trapped in a NOx catalyst desorbs from the NOx catalyst without being reduced) is reflected thereon. It should be noted that the space velocity SV of exhaust gases is calculated by a predetermined method according to the engine speed NE and the intake air amount QA.

Figure 4:
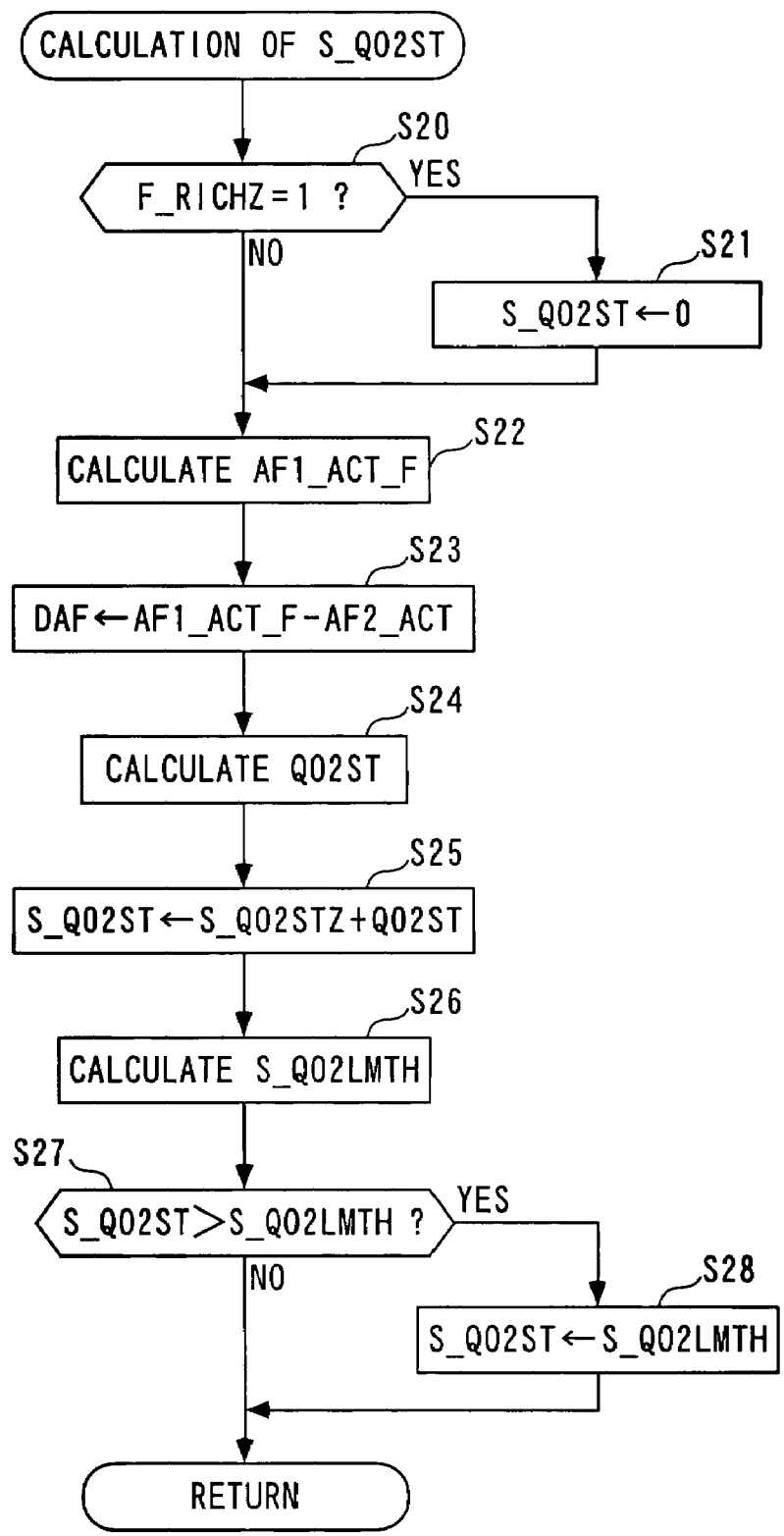
FIG. 4 is a flowchart showing a process for calculating an oxygen occlusion amount indicative of the amount of oxygen occluded in a three-way catalyst.

Next, in a step 5, it is determined whether or not the trapped NOx amount S_QNOx is not smaller than the reference value S_QNOxREF. If the answer to this question is negative (NO), it is judged that since the amount of NOx trapped in the NOx catalyst 17 is still small, the conditions for executing the rich spike operation are not satisfied, and the process proceeds to a step 12, wherein the oxygen occlusion amount S_QO2ST of the three-way catalyst 16 is calculated, followed by terminating the present process. The oxygen occlusion amount S_QO2ST is a value corresponding to the amount of oxygen occluded in the three-way catalyst 16 during lean operation of the engine, and is specifically calculated as shown in FIG. 4, referred to hereinafter.

On the other hand, if the answer to the question of the step 5 is affirmative (YES), i.e. if S_QNOx≧S_QNOxREF holds, it is judged that the conditions for executing the rich spike operation are satisfied, so that the rich spike flag F_RICH is set to 1 (step 6) to start the rich spike operation.

Figure 7:
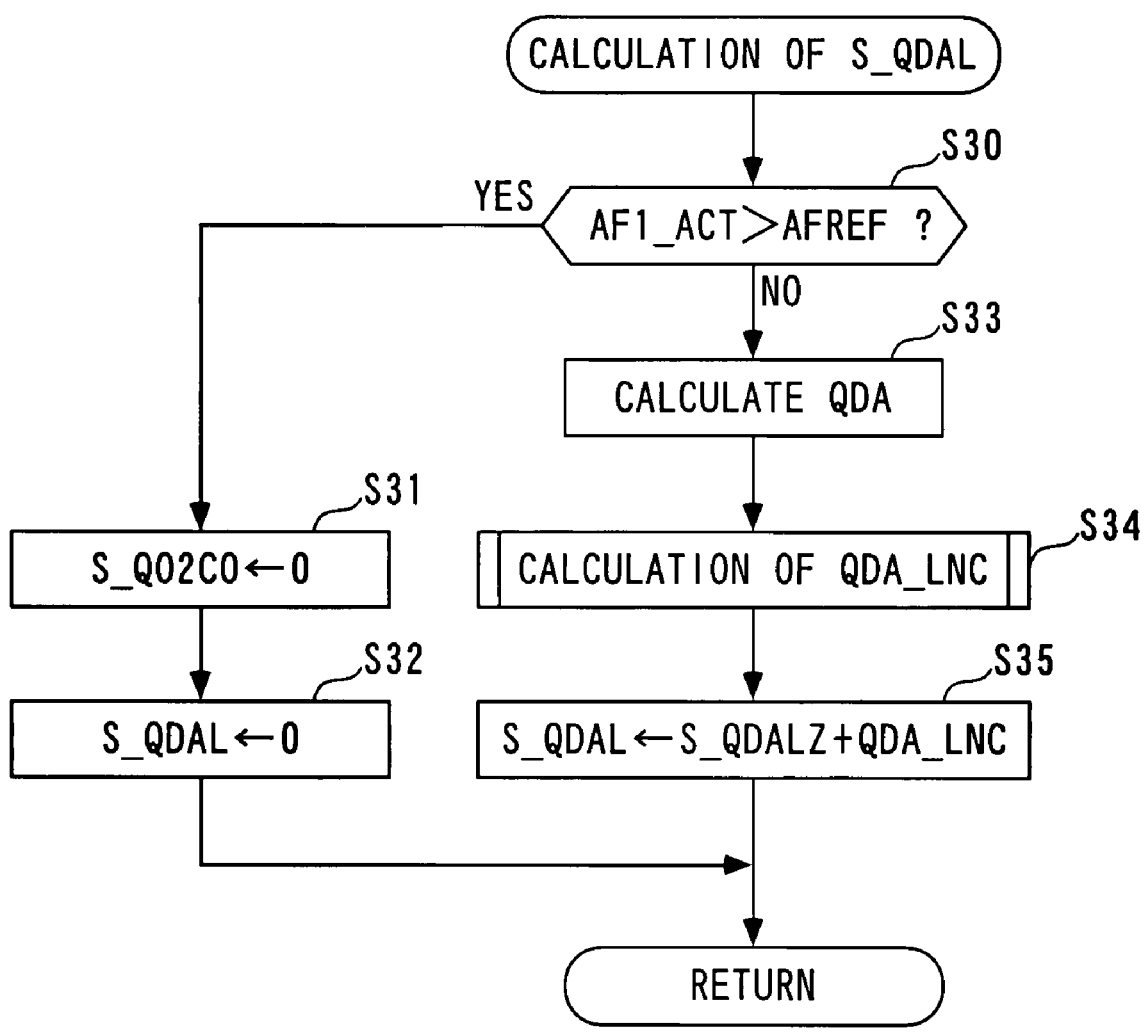
FIG. 7 is a flowchart showing a process for calculating a cumulative value of a reducing agent supply amount.

Then, in a step 7, a reducing agent supply amount cumulative value S_QDAL is calculated. The reducing agent supply amount cumulative value S_QDAL corresponds to the total amount of reducing agent estimated to be actually supplied to the NOx catalyst 17 from the start of the rich spike operation, and is specifically calculated as shown in FIG. 7, referred to hereinafter.

Next, it is determined whether or not the calculated reducing agent supply amount cumulative value S_QDAL is larger than a reference value S_QDAREF (step 8). The reference value S_QDAREF is set according to the trapped NOx amount reference value S_QNOxREF calculated in the step 4.

If the answer to the question of the step 8 is negative (NO), i.e. if S_QDAL≦S_QDAREF holds, it is judged that a sufficient amount of reducing agent has not been supplied to the NOx catalyst 17 yet, and hence the reduction of NOx has not been completed, so that the present process is terminated to continue the rich spike operation.

On the other hand, if the answer to this question of the step 8 is affirmative (YES), i.e. if S_QDAL>S_QDAREF holds, it is judged that a sufficient amount of reducing agent has been supplied to the NOx catalyst 17, and hence the reduction of NOx is completed, so that the rich spike flag F_RICH is set to 0 (step 9), to terminate the rich spike operation. Further, the trapped NOx amount S_QNOx and the reducing agent supply amount cumulative value S_QDAL are reset to 0 (steps 10 and 11), and then the step 12 is executed, followed by terminating the present process.

FIG. 4 shows a process for calculating the oxygen occlusion amount S_QO2ST, executed in the step 12 in FIG. 3. As described above, the oxygen occlusion amount S_QO2ST represents the amount of oxygen occluded in the three-way catalyst 16 during lean operation of the engine, i.e. the amount of oxygen having been occluded in the three-way catalyst 16 at the start of the rich spike operation.

In this process, first, in a step 20, it is determined whether or not the immediately preceding value of the rich spike flag F_RICHZ is equal to 1. If the answer to the question is affirmative (YES), i.e. if this is the first control timing after termination of the rich spike operation, the oxygen occlusion amount S_QO2ST is set to 0 (step 21), and the process proceeds to a step 22. If the answer to the question of the step 20 is negative (NO), the step 21 is skipped, and the process proceeds to a step 22.

In the step 22, the first air-fuel ratio detected by the first LAF sensor 33 is subjected to first-order lag filtering, whereby a filtered value AF1_ACT_F of the first air-fuel ratio is calculated.

Then, an air-fuel ratio difference DAF is calculated by subtracting the second actual air-fuel ratio AF2_ACT detected by the second LAF sensor 34 from the calculated filtered value AF1_ACT_F of the first actual air-fuel ratio (step 23). It should be noted that the filtered value AF1_ACT_F is used for the first actual air-fuel ratio so as to cause dead time taken for exhaust gases to flow from the upstream side of the three-way catalyst 16 to the downstream side thereof to be reflected thereon.

Figure 5:
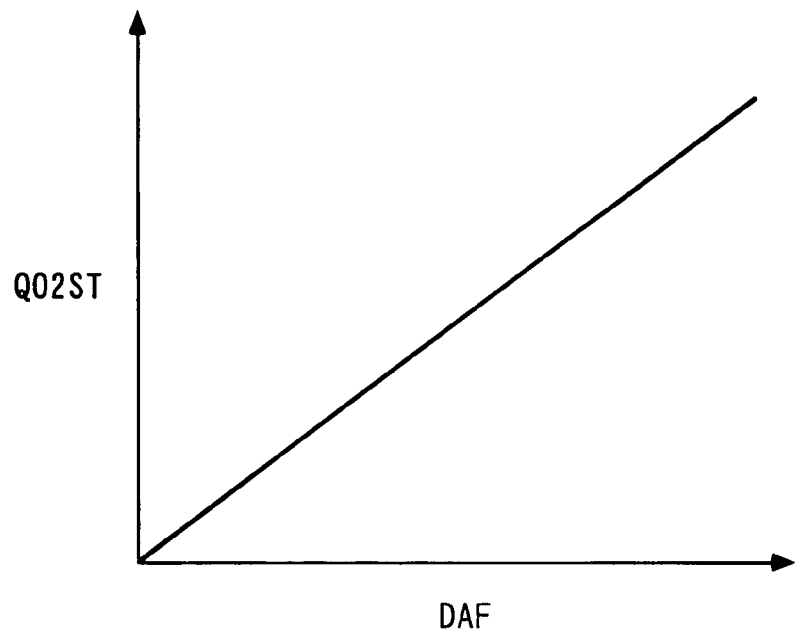
FIG. 5 is a diagram showing an example of a table for use in the FIG. 4 process.

Then, an oxygen adsorption amount QO2S is calculated by searching a table shown in FIG. 5 according to the calculated air-fuel ratio difference DAF (step 24). The oxygen adsorption amount QO2ST corresponds to the amount of oxygen adsorbed in the three-way catalyst 16 in the present cycle.

In this table, the oxygen adsorption amount QO2ST is set to a larger value as the air-fuel ratio difference DAF is larger. This is because as the air-fuel ratio difference DAF is larger, i.e. the degree of decrease in the second actual air-fuel ratio AF2_ACT with respect to the first actual air-fuel ratio AF1_ACT is larger, a larger amount of oxygen is estimated to be deprived of (adsorbed) by the three-way catalyst 16.

Next, the oxygen occlusion amount S_QO2ST is calculated by adding the calculated oxygen adsorption amount QO2ST to the immediately preceding value S_QO2STZ of the oxygen occlusion amount (step 25).

Figure 6:
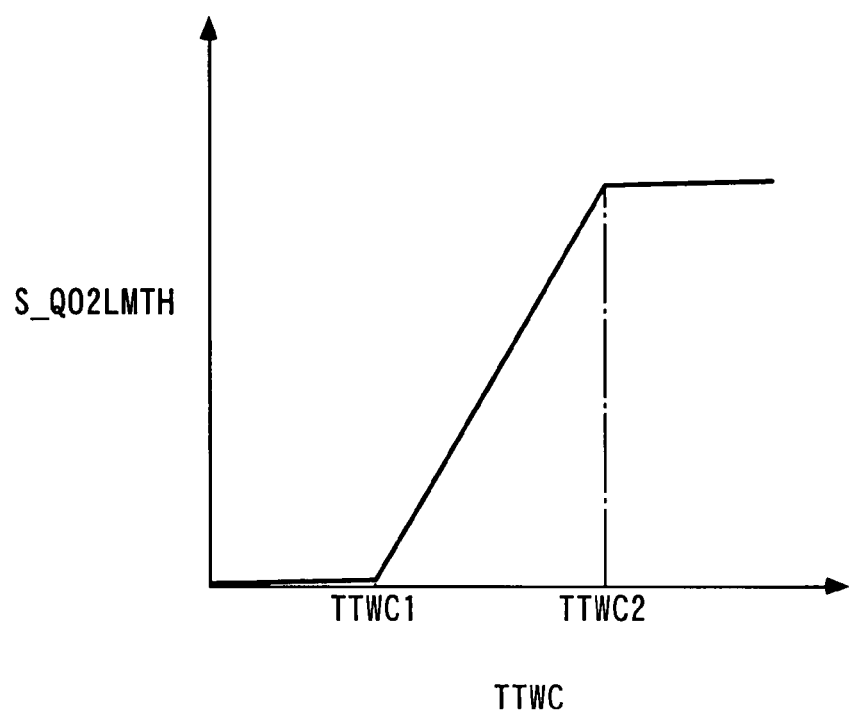
FIG. 6 is a diagram showing an example of another table for use in the FIG. 4 process.

Then, in a step 26, an upper limit value S_QO2LMTH of the oxygen occlusion amount S_QO2ST is calculated by searching a table shown in FIG. 6 according to the three-way catalyst temperature TTWC. In this table, the upper limit value S_QO2LMTH is set to a larger value as the three-way catalyst temperature TTWC is higher. This is because as the three-way catalyst temperature TTWC is higher, the degree of activity of the three-way catalyst 16 is higher and hence the oxygen occlusion ability of the three-way catalyst 16 is higher. Further, in a low temperature region of TTWC≦TTWC1, and in a high temperature region of TTWC≦TTWC2, the three-way catalyst is in a state in which the oxygen occlusion ability thereof hardly changes even with a change in the three-way catalyst temperature TTWC.

Next, a limiting process is carried out on the oxygen occlusion amount S_QO2ST using the calculated upper limit value S_QO2LMTH. Specifically, it is determined whether or not the oxygen occlusion amount S_QO2ST is larger than the upper limit value S_QO2LMTH (step 27). If the answer to the question is affirmative (YES), i.e. if S_QO2ST>S_QO2LMTH holds, the oxygen occlusion amount S_QO2ST is set to the upper limit value S_QO2LMTH (step 28). On the other hand, if the answer to this question of the step 27 is negative (NO), the present process is immediately terminated.

FIG. 7 is a flowchart showing a process for calculating the cumulative value S_QDAL of the reducing agent supply amount, which is executed in the step 7 in FIG. 3. As mentioned above, the reducing agent supply amount cumulative value S_QDAL represents the total amount of reducing agent actually supplied to the NOx catalyst 17 from the start of the rich spike operation.

In this process, first, in a step 30, it is determined whether or not the first actual air-fuel ratio AF1_ACT is higher than a predetermined reference value AFREF. The determination is executed because exhaust gases immediately after the start of the rich spike operation are in an oxidizing atmosphere, and hence to determine whether or not the reducing agent in the exhaust gases is oxidized to be fully consumed in the three-way catalyst 16 by a relatively large amount of oxygen remaining in the exhaust gases. To this end, the predetermined reference value AFREF is set to such a value (e.g. 14.7) close to the stoichiometric air fuel-ratio.

If the answer to the question of the step 30 is affirmative (YES), and when AF1_ACT>AFREF holds, it is determined that all the reducing agent in the exhaust gases is oxidized to be fully consumed in the three-way catalyst 16 by oxygen remaining in the exhaust gases and. Therefore, an oxygen consumption amount cumulative value S_QO2CO, referred to hereinafter, is set to 0 (step 31), and the cumulative value of the reducing agent supply amount S_QDAL is set to 0 (step 32), followed by terminating the present process.

On the other hand, if the answer to the question of the step 30 is negative (NO) and when AF1_ACT≦AFREF holds, it is judged that the aforementioned reducing agent consuming state is terminated, and reducing agent in the exhaust gases is oxidized to be partially consumed by oxygen remaining in the exhaust gases and oxygen occluded in the three-way catalyst 16 during lean operation of the engine, and the process proceeds to a step 33, wherein the amount QDA of reducing agent (reducing agent amount) is calculated by the following equation (1):

$$QDA = QA \cdot (14.7 - AF1\_ACT) \qquad (1)$$

The reducing agent amount QDA corresponds to the amount of reducing agent flowing into the three-way catalyst 16 in the present cycle.

Figure 8:
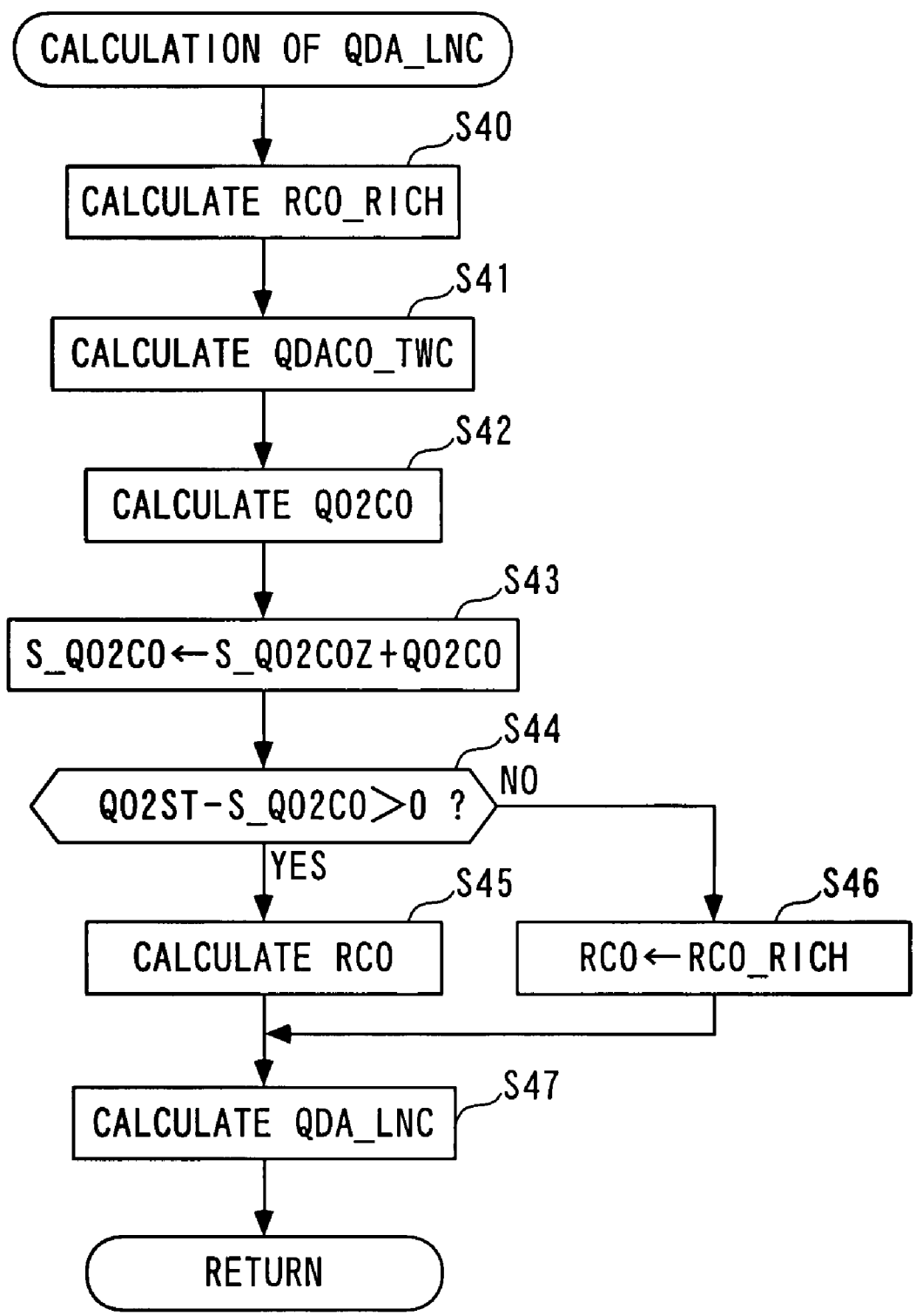
FIG. 8 is a flowchart showing a process for calculating the reducing agent supply amount.

Next, the process proceeds to a step 34, wherein a reducing agent supply amount QDA_LNC is calculated. The reducing agent supply amount QDA_LNC represents the amount of part of the reducing agent amount QDA of reducing agent flowing into the three-way catalyst, which is actually supplied to the NOx catalyst 17 without being consumed in the three-way catalyst 16, in the present cycle, and is specifically calculated in a process for the calculation shown in FIG. 8.

Figure 9:
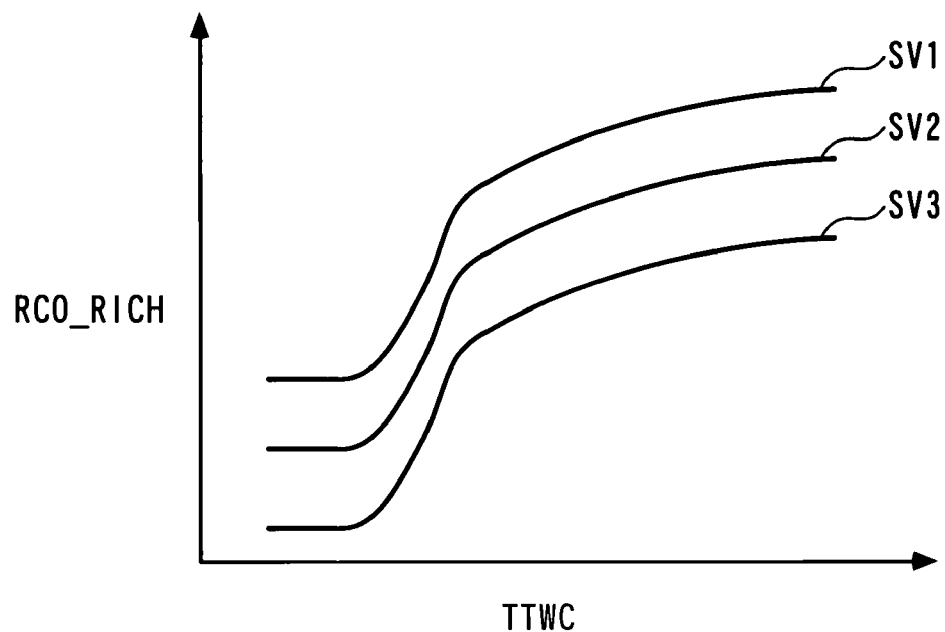
FIG. 9 is a diagram showing an example of a map for use in the FIG. 8 process.

In this process, first, in a step 40, a steady-state reducing agent consumption ratio RCO_RICH is calculated by searching a map shown in FIG. 9 according to the three-way catalyst temperature TTWC and the space velocity SV of exhaust gases. The steady-state reducing agent consumption ratio RCO_RICH represents a ratio of the amount of reducing agent consumed in three-way catalyst 16 in a steady state having released all oxygen having been occluded therein during the lean operation, by oxidation by oxygen remaining in the exhaust gases, to the reducing agent amount QDA, during the rich spike control.

In this map, the steady-state reducing agent consumption ratio RCO_RICH is set to a larger value as the three-way catalyst temperature TTWC is higher. This is because as the three-way catalyst temperature TTWC is higher, the oxidation ability of the three-way catalyst 16 is higher, whereby the ratio of the amount of reducing agent oxidized by the three-way catalyst 16 becomes higher. Further, in the map, SV1 to SV3 satisfy the relationship of SV1<SV2<SV3, and the steady-state reducing agent consumption ratio RCO_RICH is set to a larger value as the space velocity SV of exhaust gases is lower. This is because as the space velocity SV of exhaust gases is lower, the probability of reducing agent being brought into contact with the three-way catalyst 16 becomes higher, whereby the ratio of the amount of reducing agent oxidized by the three-way catalyst 16 becomes higher.

Next, the process proceeds to a step 41, wherein a reducing agent consumption amount QDACO_TWC is calculated by the following equation (2):

$$QDACO\_TWC = QDA \cdot \left(\frac{RCOZ - RCO\_RICH}{100}\right) \qquad (2)$$

The reducing agent consumption amount QDACO_TWC represents the amount of reducing agent consumed by the three-way catalyst 16 in the present cycle. In the above equation (2), RCOZ represents the immediately preceding value of a reducing agent consumption ratio RCO calculated by an equation (3), referred to hereinafter, and the initial value of the reducing agent consumption ratio RCO is set to a predetermined value RCO_REF, referred to hereinafter.

Figure 10:
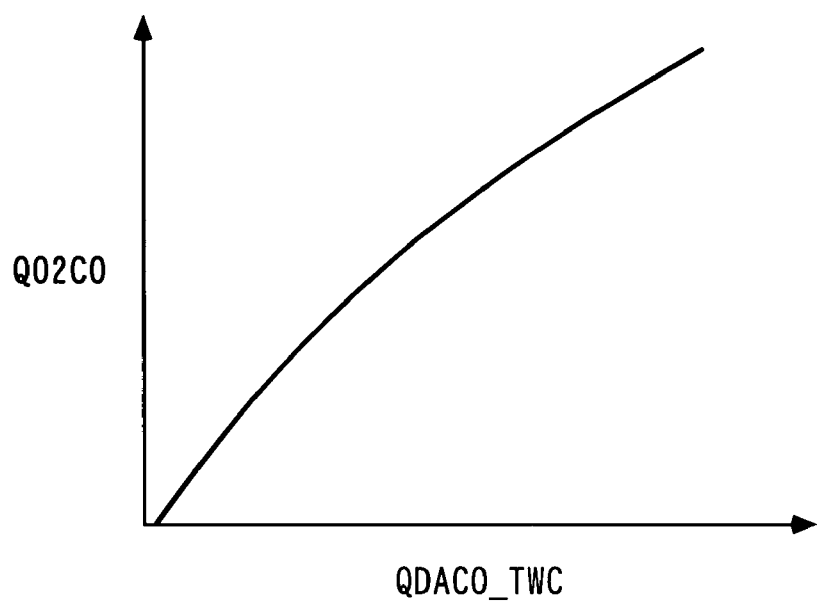
FIG. 10 is a diagram showing an example of a table for use in the FIG. 8 process.

Then, an oxygen consumption amount QO2CO is calculated by searching a table shown in FIG. 10 according to the calculated reducing agent consumption amount QDACO_TWC (step 42). The oxygen consumption amount QO2CO represents the amount of part of (the amount of decrease in) oxygen having been occluded in the three-way catalyst 16, which is consumed by oxidation reaction with reducing agent in the present cycle. Therefore, in this table, the oxygen consumption amount QO2CO is set to a larger vale as the three-way catalyst temperature TTWC is higher.

Next, the oxygen consumption amount cumulative value S_QO2CO is calculated by adding the calculated oxygen consumption amount QO2CO to the immediately preceding value S_QO2COZ of the oxygen consumption amount cumulative value (step 43).

Then, in a step 44, it is determined whether or not the difference (=S_QO2ST−S_QO2CO) between the oxygen occlusion amount S_QO2ST calculated in the step 12 in FIG. 3 and the oxygen consumption amount cumulative value S_QO2CO is larger than 0. If the answer to this question is affirmative (YES), it is determined that oxygen still remains occluded in the three-way catalyst 16, and the process proceeds to a step 45, wherein the reducing agent consumption ratio RCO is calculated by the following equation (3):

$$RCO = RCO\_REF \cdot \alpha \cdot \left(\frac{QO2ST - S\_QO2CO}{QO2ST}\right) \qquad (3)$$

The reducing agent consumption ratio RCO indicates the ratio of reducing agent consumed in the three-way catalyst 16 to the amount of reducing agent flowing into the three-way catalyst 16.

In the above equation (3), RCO_REF represents the predetermined value (e.g. 100%) of the reducing agent consumption ratio of reducing agent consumed by oxygen remaining in exhaust gases during the lean operation, and α represents a predetermined adjustment coefficient.

On the other hand, if the answer to the question of the step 44 is negative (NO), it is judged that all oxygen occluded in the three-way catalyst 16 has been consumed, the process proceeds to a step 46, wherein the reducing agent consumption ratio RCO is set to the rich-time steady-state reducing agent consumption ratio RCO_RICH calculated in the step 40.

In a step 45 or a step 47 following the step 46, wherein the reducing agent supply amount QDA_LNC is calculated by the following equation (4):

$$\text{QDA\_LNC} = QDA \cdot \left(1 - \frac{RCA}{100}\right) \tag{4}$$

and the present process is terminated.

Referring again to FIG. 7, in a step 35 following the step 34, the reducing agent supply amount cumulative value S_QDAL is calculated by adding the reducing agent supply amount QDA_LNC, calculated as described above, to the immediately preceding value S_QDALZ of the reducing agent supply amount cumulative value, followed by terminating the present process.

Figure 11:
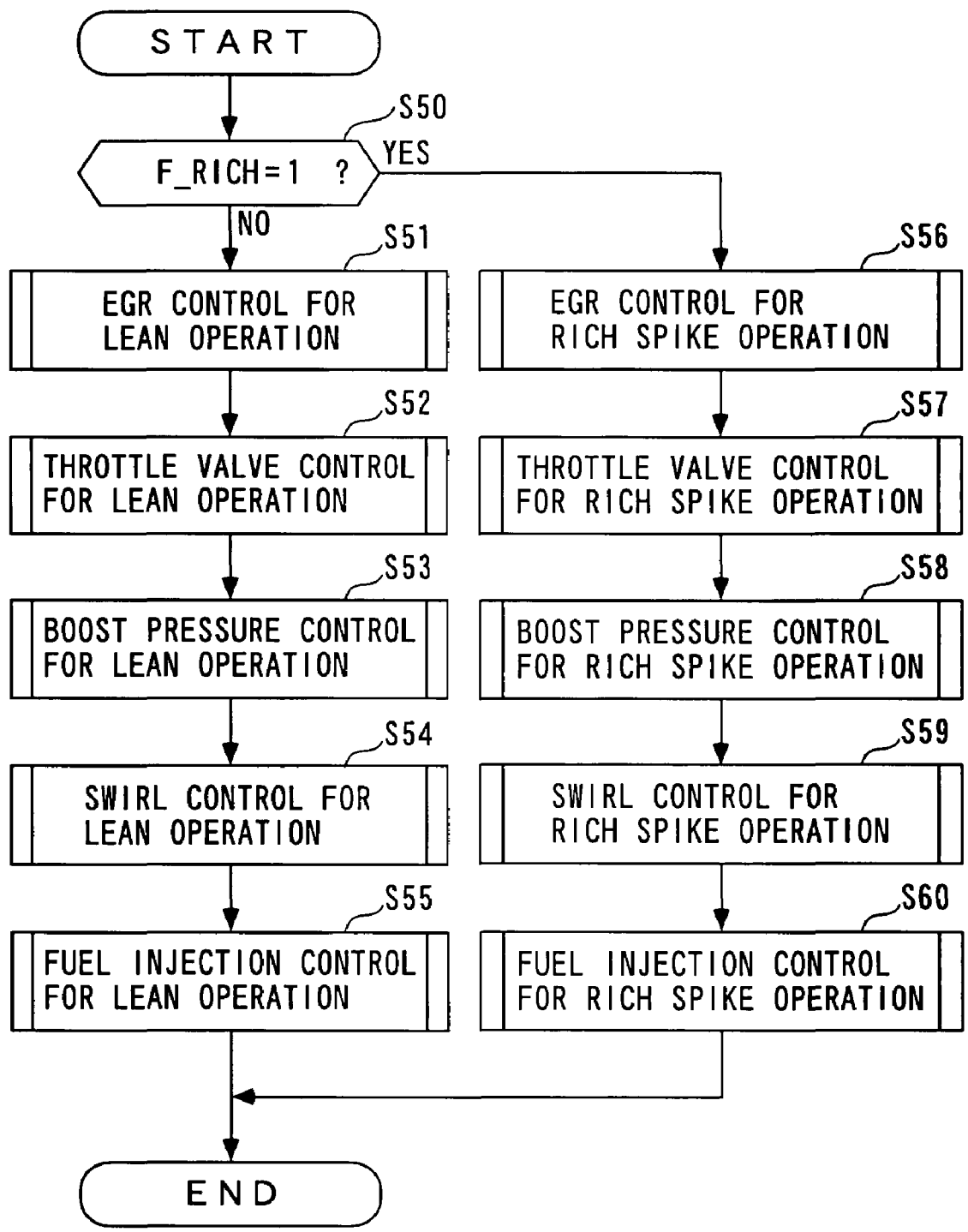
FIG. 11 is a flowchart showing an air-fuel ratio control process.

Next, the air-fuel ratio control process carried out by the ECU 2 will be described with reference to FIG. 11. As described hereinafter, this process is provided for carrying out various control processes to thereby control the air-fuel ratio of a mixture to be supplied to the combustion chamber 3c, and is executed at a predetermined control period (synchronous with generation of each TDC signal pulse).

In the air-fuel ratio control process, first, in a step 50, it is determined whether or not the aforementioned rich spike flag F_RICH is equal to 1. If the answer to this question is negative (NO), i.e. if the conditions for executing the rich spike operation are not satisfied, the air-fuel ratio control process for the lean operation is carried out, as described hereinafter.

First, in a step 51, an EGR control process for the lean operation is executed. More specifically, a duty ratio DUTY_LEAN for the lean operation is calculated by searching a map, not shown, according to the demanded torque PMCMD and the engine speed NE. Then, a drive signal set to the duty ratio DUTY_LEAN is supplied to the EGR control valve 14b to thereby execute EGR control for the lean operation.

Then, the process proceeds to a step 52, wherein a throttle valve control process for the lean operation is carried out. More specifically, a target throttle valve opening TH_CMD is set to a predetermined WOT (Wide-Open Throttle) value TH_WOT, and a drive signal corresponding to the target throttle valve opening TH_CMD is supplied to the actuator 12a, whereby the throttle valve 12 is controlled such that it is fully open.

Next, in a step 53, a boost pressure control process for the lean operation is performed. More specifically, a target vane opening of the variable vanes 8c for the lean operation is calculated by searching a map, not shown, according to the demanded torque PMCMD and the engine speed NE, and a drive signal corresponding to the target vane opening for the lean operation is supplied to the vane opening control valve 10, whereby boost pressure is controlled.

In a step 54 following the step 53, a swirl control process for the lean operation is carried out. More specifically, a target swirl opening of the swirl valve 13a for the lean operation is calculated by searching a map, not shown, according to the demanded torque PMCMD and the engine speed NE, and a drive signal corresponding to the target swirl opening for the lean operation is supplied to the swirl control valve 13c, whereby the swirl is controlled.

Next, the process proceeds to a step 55, wherein a fuel injection control process for the lean operation is carried out. More specifically, a basic fuel injection amount is calculated by searching a map, not shown, according to the demanded torque PMCMD and the engine speed NE, and is corrected according to various operating condition parameters, to thereby calculate a fuel injection amount for the lean operation. Next, a fuel injection start timing for the lean operation is calculated by searching a map, not shown, according to the above fuel injection amount for the lean operation and the engine speed NE. Then, the valve-opening timing and valve-closing timing of each injector 6 are controlled based on the fuel injection amount for the lean operation and the fuel injection start timing, calculated as above, followed by terminating the present process.

By the air-fuel ratio control process for the lean operation, carried out in the above steps 51 to 55, the air-fuel ratio is controlled such that it becomes equal to the target air-fuel ratio for the lean operation.

On the other hand, if the answer to the question of the step 50 is affirmative (YES), i.e. if the conditions for executing the rich spike operation are satisfied, the air-fuel ratio control process for the rich spike operation is carried out, as described hereinafter.

First, in a step 56, an EGR control process for the rich spike operation is executed. More specifically, a target intake air amount QARICH for the rich spike operation is calculated by searching a map, not shown, according to the demanded torque PMCMD and the engine speed NE. Next, a duty ratio DUTY_RICH for the rich spike operation is calculated with a predetermined feedback control algorithm such that the intake air amount QA converges to the target intake air amount QARICH. Then, a drive signal set to the above duty ratio DUTY_RICH is supplied to the EGR control valve 14b to thereby execute EGR control for the rich spike operation.

Then, the process proceeds to a step 57, wherein a throttle valve control process for the rich spike operation is carried out. More specifically, a target throttle valve opening TH_CMD for the rich spike operation is calculated by searching a map, not shown, according to the demanded torque PMCMD and the engine speed NE. Then, a drive signal corresponding to the target throttle valve opening TH_CMD is supplied to the actuator 12a, whereby the throttle valve opening TH is controlled such that it becomes equal to the target throttle valve opening TH_CMD.

Next, in a step 58, a boost pressure control process for the rich spike operation is performed. More specifically, a target vane opening of the variable vanes 8c for the rich spike operation is calculated by searching a map, not shown, according to the demanded torque PMCMD and the engine speed NE, and a drive signal corresponding to the target vane opening for the rich spike is supplied to the vane opening control valve 10, whereby boost pressure is controlled.

In a step 59 following the step 58, a swirl control process for the rich spike operation is carried out. More specifically, a target swirl opening of the swirl valve 13a for the rich spike operation is calculated by searching a map, not shown, according to the demanded torque PMCMD and the engine speed NE. Then, a drive signal corresponding to the target swirl opening for the rich spike is supplied to the swirl control valve 13c, whereby the swirl is controlled.

Next, the process proceeds to a step 60, wherein a fuel injection control process for the rich spike operation is carried out. More specifically, a basic fuel injection amount is calculated by searching a map, not shown, according to the demanded torque PMCMD and the engine speed NE, and is corrected according to the operating condition parameters, to thereby calculate a fuel injection amount for the rich spike operation. Then, a fuel injection start timing for the rich spike operation is calculated by searching a map, not shown, according to the above fuel injection amount for the rich spike and the engine speed NE. Then, the valve-opening timing and valve-closing timing of each injector 6 are controlled based on the fuel injection amount and the fuel injection start timing for the rich spike operation, calculated as above, followed by terminating the present process.

By the air-fuel ratio control process for the rich spike, carried out in the above steps 56 to 60, the air-fuel ratio is controlled such that it becomes equal to the target air-fuel ratio for the rich spike operation.

As described above, according to the present embodiment, during the lean operation, the oxygen occlusion amount S_QO2ST indicative of the amount of oxygen occluded in the three-way catalyst disposed upstream of the NOx catalyst 17 is calculated (step 12 in FIG. 4). The oxygen occlusion amount S_QO2ST is stored as the occlusion amount of oxygen at the start of the rich spike operation. Further, during the rich spike operation, the oxygen consumption amount QO2CO of oxygen consumed in the three-way catalyst 16 by oxidation reaction with reducing agent, and the oxygen consumption amount cumulative value S_QO2CO as the cumulative value thereof are calculated (steps 42 and 43), and according to the difference (=the oxygen occlusion amount during the rich spike operation) between the oxygen occlusion amount S_QO2ST and the oxygen consumption amount cumulative value S_QO2CO, the reducing agent consumption ratio RCO and the reducing agent consumption amount QDACO_TWC due to oxidation in the three-way catalyst 16 are calculated (step 41, and equations (2) and (3)). Further, the reducing agent supply amount QDA_LNC indicative of the amount of reducing agent supplied to the NOx catalyst 17 is calculated according to the calculated reducing agent consumption amount QDACO_TWC (steps 45 and 47, equations (3) and (4)), and the reducing agent supply amount cumulative value S_QDAL as the cumulative value thereof is calculated (step 35).

As described above, during the rich spike operation, the reducing agent consumption amount QDACO_TWC is calculated as time elapses according to the oxygen occlusion amount S_QO2ST indicative of the amount of oxygen occluded in the three-way catalyst 16 at the start of the rich spike operation and the oxygen consumption amount cumulative value S_QO2CO indicative of the amount of oxygen consumed in the three-way catalyst 16 from the start of the rich spike operation, and the reducing agent supply amount QDA_LNC indicative of the amount reducing agent supplied to the NOx catalyst 17 is calculated according to the calculated reducing agent consumption amount QDACO_TWC at time elapses. Therefore, it is possible to accurately calculate the reducing agent supply amount QDA_LNC indicative of the amount of reducing agent actually supplied to the NOx catalyst 17 while causing the amount of reducing agent consumed by oxidation in the three-way catalyst 16 to be reflected thereon. Then, when the reducing agent supply amount cumulative value S_QDAL as the cumulative value of the thus calculated reducing agent supply amount QDA_LNC exceeds the reference value S_QDAREF, the rich spike operation is terminated (steps 8 and 9), and hence it is possible to supply a just enough amount of reducing agent to the NOx catalyst 17. As a result, it possible to reduce exhaust emissions and improve fuel economy without causing insufficient reduction of NOx or excessive generation of HC and CO.

Further, the oxygen occlusion amount S_QO2ST indicative of the amount of oxygen occluded in the three-way catalyst 16 is calculated according to the air-fuel ratio difference DAF between the first actual air-fuel ratio AF1_ACT upstream of the three-way catalyst 16 and the second actual air-fuel ratio downstream of the same, and three-way catalyst temperature TTWC (step 23 to 28). This makes it possible to accurately calculate the oxygen occlusion amount S_QO2ST while causing the degree of oxygen adsorption in the three-way catalyst 16 and the degree of activity of the same to be reflected thereon.

It should be noted that the present invention is by no means limited to the embodiment described above, but it can be practiced in various forms. For example, the methods of calculating the amount of oxygen occlude in the three-way catalyst 16, the amount of reducing agent consumed in the same, and the amount of reducing agent supplied to the NOx catalyst 17 are described only by way of example, and but any other suitable methods can be employed insofar as the goal of the invention is achieved.

Further, although in the above-described embodiment, the three-way catalyst 16 is employed for the catalyst, this is not limitative, but any catalyst may be employed insofar as it has at least the oxygen occlusion function and the oxidation function. Further, although in the above-described embodiment, during the rich spike operation, the reducing agent is supplied by increasing the amount of fuel injected from the injector 6 into the combustion chamber 3c, this is not limitative, but another injector for supply of reducing agent may be disposed in the exhaust pipe 5 to thereby directly inject reducing agent into exhaust gases, by way of example.

Furthermore, the present invention may be applied not only to the diesel engine installed on a vehicle but also to a gasoline engine, such as a lean burn engine. Further, the present invention can be applied to various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, for purifying exhaust gases discharged from the engine into an exhaust system, comprising:

a catalyst that is disposed in the exhaust system and has an oxygen occlusion function and an oxidation function for purifying exhaust gases;

a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx;

NOx reduction control means for executing reduction control in which the exhaust gases flowing into said NOx catalyst are controlled to the reducing atmosphere, by supplying reducing agent to an upstream side of said catalyst so as to cause said NOx catalyst to carry out an operation for reducing NOx;

oxygen occlusion amount-calculating means for calculating an amount of oxygen occluded in said catalyst as an oxygen occlusion amount;

reducing agent consumption amount-calculating means for calculating an amount of reducing agent consumed by oxidation in said catalyst during execution of the reduction control by the NOx reduction control by said NOx reduction control means, as a reducing agent consumption amount, according to the calculated oxygen occlusion amount;

reducing agent supply amount-calculating means for calculating an amount of reducing agent supplied to said NOx catalyst, as a reducing agent supply amount, according to the calculated reducing agent consumption amount; and reduction control-terminating means for terminating the reduction control when the calculated reducing agent supply amount exceeds a threshold value.

2. An exhaust emission control device as claimed in claim 1, further comprising catalyst temperature-detecting means for detecting a temperature of said catalyst, and wherein said oxygen occlusion amount-calculating means calculates the oxygen occlusion amount according to the detected temperature of the catalyst.

3. An exhaust emission control device as claimed in claim 1, further comprising:

upstream air-fuel ratio-detecting means for detecting an air-fuel ratio upstream of said catalyst; and downstream air-fuel ratio-detecting means for detecting an air-fuel ratio downstream of said catalyst, and wherein said oxygen occlusion amount-calculating means calculates the oxygen occlusion amount according to a difference between the detected upstream air-fuel ratio and the detected downstream air-fuel ratio.

4. An exhaust emission control method for purifying exhaust gases discharged from an internal combustion engine into an exhaust system, the engine including a catalyst that is disposed in the exhaust system and has an oxygen occlusion function and an oxidation function for purifying exhaust gases, and a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx, the exhaust emission control method comprising:

a NOx reduction control step of executing reduction control in which the exhaust gases flowing into the NOx catalyst are controlled to the reducing atmosphere, by supplying reducing agent to an upstream side of the catalyst so as to cause the NOx catalyst to carry out an operation for reducing NOx;

an oxygen occlusion amount-calculating step of calculating an amount of oxygen occluded in the catalyst as an oxygen occlusion amount;

a reducing agent consumption amount-calculating step of calculating an amount of reducing agent consumed by oxidation in the catalyst during execution of the reduction control by the NOx reduction control in said NOx reduction control step, as a reducing agent consumption amount, according to the calculated oxygen occlusion amount;

a reducing agent supply amount-calculating step of calculating an amount of reducing agent supplied to the NOx catalyst, as a reducing agent supply amount, according to the calculated reducing agent consumption amount; and a reduction control-terminating step of terminating the reduction control when the calculated reducing agent supply amount exceeds a threshold value.

5. An exhaust emission control method as claimed in claim 4, further comprising a catalyst temperature-detecting step of detecting a temperature of the catalyst, and wherein said oxygen occlusion amount-calculating step includes calculating the oxygen occlusion amount according to the detected temperature of the catalyst.

6. An exhaust emission control method as claimed in claim 4, further comprising:

an upstream air-fuel ratio-detecting step of detecting an air-fuel ratio upstream of the catalyst; and a downstream air-fuel ratio-detecting step of detecting an air-fuel ratio downstream of the catalyst, and wherein said oxygen occlusion amount-calculating step includes calculating the oxygen occlusion amount according to a difference between the detected upstream air-fuel ratio and the detected downstream air-fuel ratio.

7. An engine control unit including a control program for causing a computer to execute an exhaust emission control method for purifying exhaust gases discharged from an internal combustion engine into an exhaust system, the engine including a catalyst that is disposed in the exhaust system and has an oxygen occlusion function and an oxidation function for purifying exhaust gases, and a NOx catalyst that is disposed in the exhaust system at a location downstream of the catalyst, for trapping NOx contained in exhaust gases in an oxidizing atmosphere, and reducing the trapped NOx in a reducing atmosphere to thereby purify the trapped NOx, wherein the control program causes the computer to execute reduction control in which the exhaust gases flowing into the NOx catalyst are controlled to the reducing atmosphere, by supplying reducing agent to an upstream side of the catalyst so as to cause the NOx catalyst to carry out an operation for reducing NOx, calculate an amount of oxygen occluded in the catalyst as an oxygen occlusion amount, calculate an amount of reducing agent consumed by oxidation in the catalyst during execution of the reduction control by the NOx reduction control, as a reducing agent consumption amount, according to the calculated oxygen occlusion amount, calculate an amount of reducing agent supplied to the NOx catalyst, as a reducing agent supply amount, according to the calculated reducing agent consumption amount, and terminate the reduction control when the calculated reducing agent supply amount exceeds a threshold value.

8. An engine control unit as claimed in claim 7, wherein the control program causes the computer to detect a temperature of the catalyst, and calculate the oxygen occlusion amount according to the detected temperature of the catalyst.

9. An engine control unit as claimed in claim 7, wherein the control program causes the computer to detect an air-fuel ratio upstream of the catalyst, detect an air-fuel ratio downstream of the catalyst, and calculate the oxygen occlusion amount according to a difference between the detected upstream air-fuel ratio and the detected downstream air-fuel ratio.

* * * * *